US005421950A

United States Patent [19]

Parrish

[11] Patent Number: 5,421,950

[45] Date of Patent: Jun. 6, 1995

[54] LABEL APPLICATOR

[75] Inventor: Benjamin E. Parrish, Prior Lake, Minn.

[73] Assignee: Rimage Corporation, Minneapolis, Minn.

[21] Appl. No.: 289,921

[22] Filed: Aug. 12, 1994

[51] Int. Cl.$^6$ .................... B32B 31/00

[52] U.S. Cl. .................... 156/579; 156/514; 156/538; 156/556; 360/133

[58] Field of Search .............. 156/514, 538, 391, 579, 156/580, 556, 69, 379.8; 360/133

[56] References Cited

U.S. PATENT DOCUMENTS 4,971,648 11/1990 Doering .................... 156/379.8 X
5,316,464 5/1994 Lexell .................... 156/359 X

*Primary Examiner*—James J. Engel
*Attorney, Agent, or Firm*—Palmatier, Sjoquist & Helget

[57] ABSTRACT

An applicator tool for adhering a gummed label to a circular disk in concentric alignment with a center hole through the disk, the applicator tool having a blade portion and a handle portion, and an alignment hub having a raised circular shoulder on one side of the blade portion and a projecting hub on the other blade surface, the shoulder and hub being aligned along an axis and the hub being sized for insertion into the disk center hole.

9 Claims, 2 Drawing Sheets

LABEL APPLICATOR

BACKGROUND OF THE INVENTION

The present invention is an applicator tool for applying a label to a disk; more particularly, the invention is principally used in connection with compact disks (CD's) wherein the upper surface of the CD has a metallic and reflective coating, and the undersurface is transparent to enable the laser recording and reading of data embedded in the disk material. The process and technique for recording data onto a CD and for reading data from a CD is well known and within the state of the art and is not directly related to the present invention. In disks of the foregoing type, it is important that the metallized coating on the top surface of the CD is maintained in a smooth and continuous film so as to preserve its reflective qualities; it is also important that the underside of the CD is maintained clean and free from any irregularities which might distort a laser light beam directed thereon.

In many disks of the foregoing type, the top surface contains preprinted materials and graphics which may be applied by a silk screening process or other form of printing process. In other types of CD, the top surface is free from any preprinting; and a paper gummed label is applied to this top surface during the disk manufacturing process. The paper label may be preprinted with pertinent information relating to the content of the disk. It is extremely important that the gummed label be applied to the top surface of the disk in precise concentricity with the disk centerline, both from the standpoint of aesthetic appearance and from the standpoint of properly balancing the disk. Since the disks are made from very lightweight plastic material and are rotated at significant rotation rates, it is possible that a non-concentric label applied to the disk surface could cause irregular rotation and distortion of the data read from the disk. Since the gummed labels are typically applied by hand, there is a need for an applicator tool which will permit the quick and accurate application of the label to the disk wherein it is assured that the label is always concentrically applied to the disk.

SUMMARY OF THE INVENTION

The present invention relates to an applicator tool for applying a gummed label to a CD, wherein the label may be correctly registered relative to the centerline of the disk as determined by the central hole in the disk. The applicator includes a handle portion for grasping, a machined surface for temporarily adhering to the gummed label and an alignment hub for registering the applicator tool and label in concentric position relative to the central hole through the CD.

It is the principal object and feature of the present invention to provide a hand-held applicator for concentrically applying a gummed label to a CD surface.

It is another object and advantage of the present invention to provide a hand-held applicator wherein a gummed label may be held in position while the applicator is registered with the CD centerline, and the gummed label may be temporarily adhered to the CD surface while the applicator is removed from its registered position, and the label may then be fully adhered to the disk surface after removal of the applicator.

The foregoing and other advantages and objects of the invention will become apparent from the following specification and claims and with reference to the appended drawings.

DESCRIPTION OF THE PREFERRED EMBODIMENT

Figure 1:
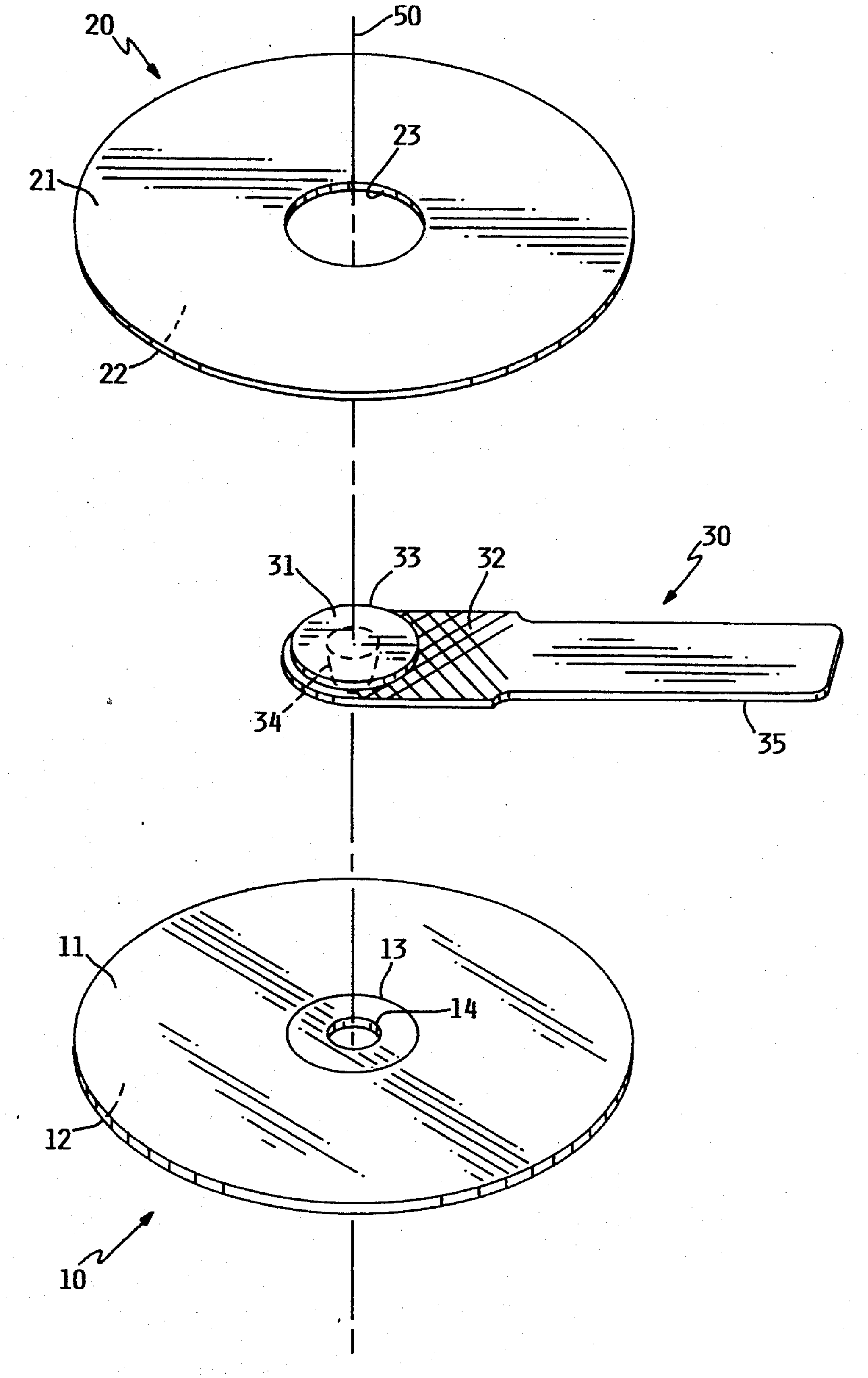
FIG. 1 shows an isometric view of a disk label, applicator and CD in registered alignment.

Referring to the figures, FIG. 1 shows a gummed label 20, an applicator tool 30 and a CD 10 all properly aligned along a vertical axis 50. The alignment axis 50 passes through the center point of the hole 14 through CD 10, and also passes through the centerline of applicator hub 34 and the centerline of hole 23 in label 20. CD 10 is made from a plastic material according to the known state of the art, wherein the disk has an upper surface 11 which contains a metallized coating. The undersurface 12 of CD 10 is transparent to permit a laser writing tool to apply encoded data to the undersurface of the disk and to permit a laser reader to retrieve the data therefrom. CD 10 has a central hole 14 which is typically about 0.600 inch in diameter. The region immediately surrounding center hole 14 is clear and transparent material, extending to a circular edge 13. The region between circular edge 13 and the outer edge of the CD 10 is typically covered by a metallized surface coating 11.

A paper label 20 which is to be applied to the disk is typically made from preprinted paper stock wherein the undersurface 22 of the paper stock has an adhesive coating and the upper surface 21 contains the necessary printed material. Label 20 is typically applied to a releasable backing material, wherein it may be removed from the backing material prior to application to the CD. The center hole 23 through the label 20 is sized to approximately match the diameter of circular portion 13 on the CD.

The applicator tool 30 has a handle portion 35 and a blade portion 32, wherein the blade portion 32 is preferably scribed with machine marks so as to provide a non-continuous surface. The purpose of this noncontinuous surface is to temporarily permit adhesion between the undersurface of label 20 and surface 32, while allowing for easy and quick removal of blade surface 32 from label 20. In the preferred embodiment the blade surface 32 has a hole therethrough, and the hole is filled by an applicator alignment hub 31. Alignment hub 31 has a semi-spherical locating hub 34 projecting therefrom and has a circular shoulder 33 which projects above the surface of blade portion 32.

Figure 2:
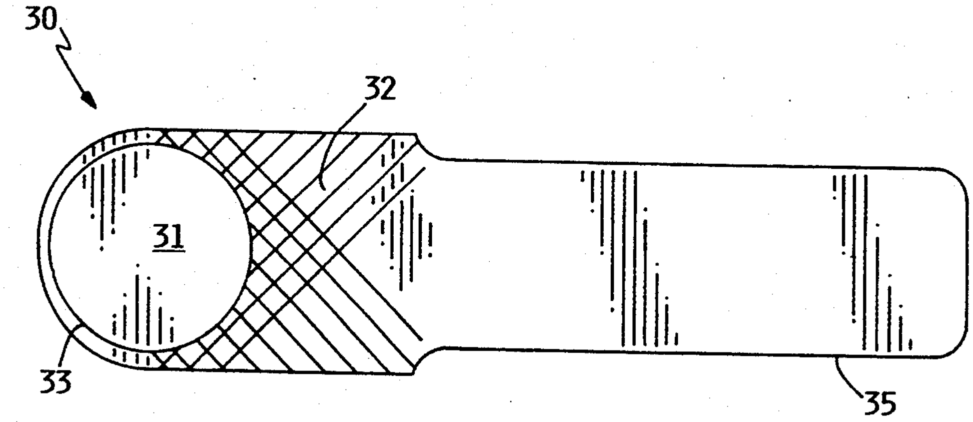
FIG. 2 shows a top view of the applicator tool.
Figure 3:
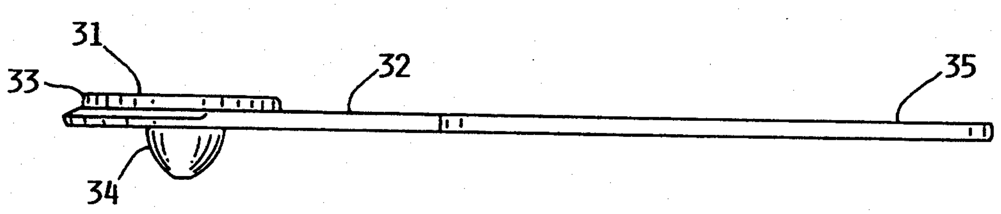
FIG. 3 shows a side elevation view of the applicator tool.
Figure 4:
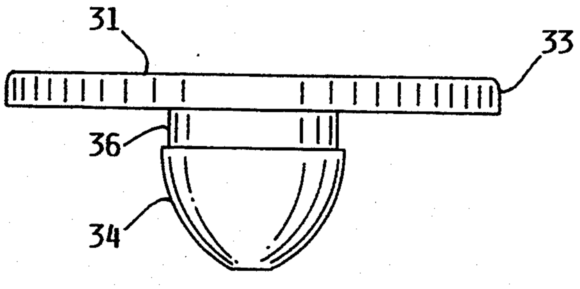
FIG. 4 shows a side elevation view of the applicator tool hub.

Referring to FIGS. 2 and 3, the diameter of shoulder portion 33 is sized to snugly fit into the hole 23 of label 20 so that label 20 may be affixed against the blade portion 32 of applicator tool 30 while shoulder 33 projects upwardly through hole 23. The semi-spherical hub 34 projects downwardly from the applicator tool. FIG. 4 shows an elevation view of alignment hub 31, wherein a shallow circumferential groove 36 is provided about the semi-spherical hub 34 at a position immediately adjacent to the undersurface of shoulder 33. This shallow groove is designed to permit hub 34 to be press fit through a central hole in blade 32 so that the alignment hub 31 may be captured and held in fixed position within the hole through the blade portion 32.

An alternative embodiment of the applicator tool 30 may also be formed in a single part, as for example a single molded plastic part. The material preferred for making the applicator tool in this manner is nylon plastic, although other types and forms of plastic may be equally well suited. In the case of a single part applicator tool 30, the circular shoulder 33 and the alignment hub 31 are formed as projections from either surface of the blade portion 32. In all other particulars, the alternative embodiment of applicator tool 30 is operable as hereinafter described.

In operation, a gummed label is first removed from its backing sheet and is then temporarily adhered against the top surface of blade portion 32 with shoulder 33 projecting through the center hole 23 of the label. Next, the alignment hub 34 is inserted into the hole 14 of CD 10 to accurately register the alignment tool 30 relative to the hole 14. Next, the undersurface of label 20 is adhered to the top surface 11 of CD 10 over a relatively small area of the surface 11, but which is sufficiently large so as to secure label 20 to CD 10. Finally, the applicator tool 30 is raised and twisted so as to release the adhesion between label 20 and applicator tool 30 and to remove applicator tool 30 from engagement with CD 10. The label may then be secured against the CD surface over its entire area, thus assuring that the label has been properly registered relative to the center hole 14 of CD 10 and assuring that the entire label surface is smoothly affixed to the top surface of CD 10.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An applicator for applying gummed labels having central openings to a disk concentrically about a center hole in the disk, comprising:

(a) an applicator blade having a generally flat surface portion and an undersurface, and a raised circular shoulder depending from said flat surface portion, said circular shoulder being aligned along an axis passing through its center and sized to fit into said label central opening;

(b) an alignment hub depending from the undersurface of said blade and aligned along said axis, said alignment hub being sized to snugly fit into said center hole; and (c) a handle extending outwardly from said applicator blade.

2. The applicator of claim 1, wherein said alignment hub further comprises a rounded end projecting away from said undersurface.

3. The applicator of claim 2, further comprising a plurality of grooves in said blade flat surface portion.

4. The applicator of claim 1, wherein said applicator blade further comprises an opening through said blade, aligned with said axis and said alignment hub is insertable through said opening.

5. The applicator of claim 4, wherein said alignment hub further comprises a rounded end projecting away from said undersurface.

6. The applicator of claim 5, further comprising a plurality of grooves in said blade flat surface portion.

7. The applicator of claim 6, wherein said alignment hub further comprises a circumferential groove adjacent said circular shoulder, said alignment hub sized for press fitting into said opening.

8. The applicator of claim 7, wherein said alignment hub and said circular shoulder are formed from a single part.

9. The applicator of claim 8, wherein said applicator blade is made from nylon material.

* * * * *